US007896330B2

(12) United States Patent
Kurabayashi et al.

(10) Patent No.: US 7,896,330 B2
(45) Date of Patent: Mar. 1, 2011

(54) BINDING PROCESSING APPARATUS

(75) Inventors: Atsushi Kurabayashi, Tokyo (JP); Toru Yoshie, Tokyo (JP)

(73) Assignee: Max Co., Ltd., Tokyo (JP)

( * ) Notice: Subject to any disclaimer, the term of this patent is extended or adjusted under 35 U.S.C. 154(b) by 1047 days.

(21) Appl. No.: 10/587,351

(22) PCT Filed: Jan. 25, 2005

(86) PCT No.: PCT/JP2005/001302
§ 371 (c)(1), (2), (4) Date: Jul. 26, 2006

(87) PCT Pub. No.: WO2005/072979
PCT Pub. Date: Aug. 11, 2005

(65) Prior Publication Data

US 2007/0166130 A1 Jul. 19, 2007

(30) Foreign Application Priority Data

Jan. 29, 2004 (JP) ................................ 2004-022156

(51) Int. Cl.
*B65G 33/04* (2006.01)
*B65G 39/00* (2006.01)

(52) U.S. Cl. ................ 270/58.08; 270/58.07; 270/58.09; 270/58.11; 270/58.12

(58) Field of Classification Search ............... 270/58.07, 270/58.08, 58.09, 58.11, 58.12
See application file for complete search history.

(56) References Cited

U.S. PATENT DOCUMENTS 3,269,720 A * 8/1966 Schluckebier et al. .... 270/52.23
4,537,545 A * 8/1985 Kunzmann ........................ 412/7
5,762,328 A * 6/1998 Yamada et al. ............ 270/58.08
6,089,558 A * 7/2000 Okumura ................... 270/58.11
6,330,999 B2 * 12/2001 Coombs et al. ............ 270/58.18
7,665,925 B2 * 2/2010 Sakata et al. ..................... 402/31
2005/0175434 A1 * 8/2005 Sakata et al. ..................... 412/38

FOREIGN PATENT DOCUMENTS

JP A-51-001686 1/1976
JP U-62-147650 9/1987
JP A-06-156854 6/1994
JP A-2001-031317 2/2001

(Continued)

*Primary Examiner* — Gene Crawford
*Assistant Examiner* — Yolanda Cumbess
(74) *Attorney, Agent, or Firm* — Morgan, Lewis & Bockius LLP

(57) ABSTRACT

A positional relation between the position of the positioning plate 22 for conducting reference-positioning on sheets of paper, which are fed onto the sheet table of the bind processing device, and the position of the division ring binder held by the binding mechanism section is set to be the same as a positional relation between the sides of the sheets of paper P and the punch holes. Forward end portions of the sheets of paper are pushed onto the sheet forward end position regulating plate 19, and the movable positioning plate 23 comes close to the reference positioning plate 22 and conducts positioning on the sheets of paper in a direction perpendicular to the sheet conveyance direction so as to arrange the positions of the sheets of paper. In this laminated state, the sheets of paper are sent to the binding mechanism section and attached with a binder. At the time of attaching the binder, positions of the punch holes and positions of the ring-portions of the division type ring binder accurately agree with each other. Accordingly, there is no possibility that the binder is defectively attached to the punch holes.

17 Claims, 18 Drawing Sheets

FOREIGN PATENT DOCUMENTS

| | | | |
|---|---|---|---|
| JP | A-2002-003067 | | 1/2002 |
| JP | 2002-337474 | | 11/2002 |
| JP | 3437511 | | 6/2003 |
| JP | A-2003-160273 | | 6/2003 |
| JP | 2003-212425 | | 7/2003 |
| JP | 2003212425 A | * | 7/2003 |
| JP | 2003-231092 | | 8/2003 |
| JP | 2003-320780 | | 11/2003 |
| JP | A-2003-320779 | | 11/2003 |
| JP | 2005-59396 | | 3/2005 |
| WO | WO03093025 | * | 11/2003 |

* cited by examiner

BINDING PROCESSING APPARATUS

TECHNICAL FIELD

The present invention relates to a binding processing apparatus for binding sheets of paper, on which punch holes are formed, by attaching a ring-shaped binder to the sheets of paper.

BACKGROUND ART

In the field of copiers, a copier, into which an electric stapler is integrated, is well known, which has an after-processing function of binding sheets of paper, which are successively sent out from a copying mechanism, by a stapler for each set. Concerning the binding means except for the means of stapling, a binding means, in which a coil binder or a comb type binder having a multiple ring-is used, is well known because of good looks and easy handling and turning pages. When binding is conducted by these binding means, it is necessary to make punch holes on sheets of paper. JP-A-2003-231092 and JP-B2-3437511 disclose a punching device, which is connected to or integrated with a copier, into which sheets of paper, which have already been subjected to copying or printing, are successively drawn and punch holes are formed by a punching means. Further, JP-A-2002-337474 discloses a coil binder. This coil binder is attached to punch holes on sheets of paper, which have already been formed, while the coil binder is being rotated.

If the punching device and the binding device described above are capable of being combined with each other, it becomes possible to link the punching device and the binding device with a copier or a printer, so that all the printing process, the punching process and the binding process can be automatically carried out. However, when the binder is attached to sheets of paper in the binding processing apparatus, unless the binder is made to agree with the respective punch holes formed on the laminated sheets of paper, it is impossible to attached the binder to the sheets of paper. In the case where binder attaching processing is continuously conducted with a ring binder in which divided ring portions are arranged on both sides of a liner spine, unless positions of the punch holes and positions of the divided ring portions accurately agree with each other, it is impossible to insert the divided ring portions of the binder into the punch holes formed on the sheets of paper. In this case, a problem of failing in attaching the binder to the sheets of paper may be caused. Further, a problem of damaging the binder may be caused. Therefore, as long as the respective punch holes, which are formed on the stacked sheets of paper, can not be made to agree with each other and the punch holes and the divided ring portions are not positionally made to agree with each other, it is impossible to automatically continuously carry out the punching and the binding processing by combining the punching processing device with the binding processing apparatus in which the ring binder is used.

DISCLOSURE OF THE INVENTION

An object of the present invention is to make positions of the punch holes, which are formed on sheets of paper sent from a punching device to a binding processing apparatus, accurately agree with a binding processing apparatus.

In the case where the binding processing is automatized, when the ring binders of booklets, which are discharged onto a stack tray after the completion of binding processing, are stacked on each other, the ring binders become bulky and it becomes difficult to handle them. Therefore, it is a second object of the present invention to reduce a space occupied by the booklets discharged after the completion of binding processing so as to make the handling easy.

In order to accomplish the above objects, the present invention provides a binding processing apparatus, the constitution of which will be described as follows. The binding processing device is provided with: a punching device; and a binding processing apparatus for attaching a binder into punch holes formed on sheets of paper. Sheets of paper, which are punched by the punching device, are successively sent onto a sheet table of the binding processing device, and a division ring type binder is attached into punch holes of one set of sheets of paper stacked on the sheet table. The sheet table includes a positioning means for conducting positioning of sheets of paper in a sheet conveyance direction and in a direction perpendicular to the sheet conveyance direction. The positioning means is composed so that a positional relation between the sheets of paper and the binder at the time of binding attaching processing can be the same as a positional relation between the sheets of paper and the punch at the time of punching processing.

In this connection, the following constitution may be adopted. A sheet forward end position regulating plate, which is retractable, is provided at a forward end portion of the sheet table so that the sheet forward end position regulating plate can be used as a reference of arranging the sheets of paper. After the completion of positioning one set of sheets of paper, the sheet forward end position regulating plate is retracted and sent to a binding mechanism section.

Further, the following constitution may be adopted. The positioning means for positioning in the direction perpendicular to the sheet conveyance direction is composed so that it can be retracted being raised from the sheet table.

Sheets of paper may be positioned on the basis of the punch holes as follows. An upper side slide pin, which descends from an upper portion of the sheet table to the table, is provided. Alternatively, a lower side slide pin, which ascends upward from a lower portion of the sheet table, and the upper side slide pin are provided. The upper side slide pin or the upper and lower side slide pins are inserted into the punch holes formed on the sheets of paper which are put on the sheet table so that the sheets of paper can be positioned on the basis of punch holes.

The following constitution may be adopted. After the sheets of paper have been positioned by the upper side slide pin or both the upper and the lower side slide pin, the sheets of paper are clamped onto the sheet table by a movable clamp, and the slide pin is retracted and sent to the binding mechanism section.

The following constitution may be adopted. After the sheets of paper have been positioned by the upper side slide pin and the sheets of paper have been clamped by the movable clamp, the slide pin is retracted and the movable clamp is released so as to wait for the supply of the successive sheets of paper.

The following constitution may be adopted. A sheet table moving mechanism is provided which makes the sheet table advance forward to the binding mechanism section and retract backward, and a sheet table rotating mechanism is provided which rotates the sheet table from a position opposing to the binding mechanism section and discharges the sheets of paper.

Further, the present invention provides a binding processing apparatus, which will be described as follows. The binding processing apparatus includes: a punching device; and a binding processing device for attaching a binder into punch holes formed on sheets of paper. Sheets of paper, which are punched by the punching device, are successively sent onto a sheet table of the binding processing device, and a division ring type binder is attached into punch holes of one set of sheets of paper stacked on the sheet table. A sheet feed mechanism is provided which alternately shifts booklets, which have been subjected to binding processing, in the lateral direction, so that rings of the binder, which is attached to the next row of booklet, can enter spaces between the rings of the binder attached to the front row of booklet.

Further, the present invention provides a binding processing apparatus, which will be described as follows. The binding processing apparatus includes: a punching device; and a binding processing device for attaching a binder into punch holes formed on sheets of paper. Sheets of paper, which are punched by the punching device, are successively sent onto a sheet table of the binding processing device, and a division ring type binder is attached into punch holes of one set of sheets of paper stacked on the sheet table. In the discharge mechanism of discharging the booklets which have been subjected to binding processing, a control means for successively shifting falling positions of the booklets to the front or the rear is provided, so that the ring binders of the sets of booklets can not be overlapped on each other.

The present invention provides a binding processing apparatus including: a punching device: and a binding processing device for attaching a binder to punch holes formed on sheets of paper, wherein the sheets of paper, which have been punched by the punching device, are successively sent to a sheet table of the binding processing device and a division ring type binder is attached to punch holes of one set of sheets of paper stacked on the sheet table. Partitions for dividing booklets into each booklet are provided in a container for receiving the booklets discharged after the completion of binding processing. A discharge control means is provided which controls to discharge the booklets one by one into a space divided by the partitions.

Further, the present invention provides a binding processing apparatus including: a punching device: and a binding processing device for attaching a binder to punch holes formed on sheets of paper, wherein the sheets of paper, which have been punched by the punching device, are successively sent to a sheet table of the binding processing device and a division ring type binder is attached to punch holes of one set of sheets of paper stacked on the sheet table. A plurality of longitudinal slats and a longitudinally moving mechanism for moving the slats are provided on the right and the left in a container for receiving the booklets discharged after the completion of binding processing. When the right and the left longitudinal slats are synchronously driven, the booklets discharged after the completion of binding processing are accommodated in the spaces, which are divided by the longitudinal slats, one by one.

The present invention provides a binding processing apparatus including: a punching device; and a binding processing device in which a ring binder is used, wherein the punching processing and the binder attaching processing are continuously carried out. A sheet table of the binding processing device includes a positioning means for conducting positioning of sheets of paper in a sheet conveyance direction and a direction perpendicular to the sheet conveyance direction. The positioning means is composed so that a positional relation between the sheets of paper and the binder at the time of binding attaching processing can be the same as a positional relation between the sheets of paper and the punch at the time of punching processing. Due to the above constitution, when the binder is attached, positions of the punch holes and positions of the ring portions of the division type ring binder accurately agree with each other. Therefore, the attaching performance can be stabilized.

Booklets, which have been subjected to binding processing, are successively discharged being shifted in the lateral direction or in the longitudinal direction, so that the ring binders of the booklets can be prevented from being overlapped on each other, and it becomes possible to reduce a height and volume of the stacked booklets after the completion of binding processing. Therefore, the booklets can be easily handled.

Figure 1:
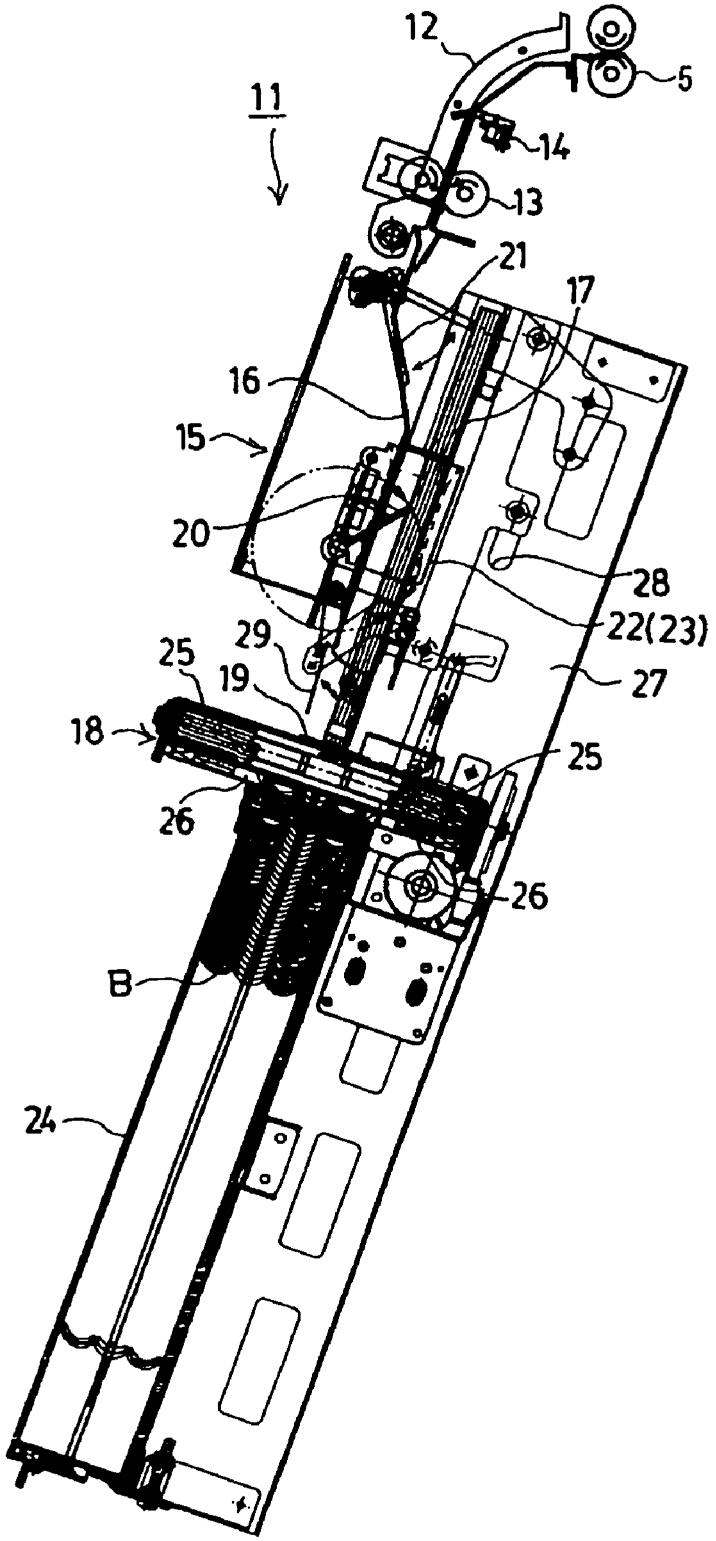
FIG. 1 is a side view showing a binding processing apparatus of an embodiment of the present invention.

In the views, reference numeral 1 is a binding processing apparatus, reference numeral 3 is a punching device, reference numeral 4 is a stack tray, reference numeral 11 is a binding processing device, reference numeral 15 is a sheet guide unit, reference numeral 16 is a sheet guide, reference numeral 17 is a sheet table, reference numeral 18 is a binding mechanism section, reference numeral 19 is a sheet forward end position regulating plate, reference numeral 22 is a positioning plate used as reference, reference numeral 23 is a movable positioning plate, reference numeral 24 is a binder cartridge, reference numeral 25 is a pusher, reference numeral 29 is a sheet clamp, reference numeral 41 is a biding processing device, reference numeral 42 is a lower side positioning pin, reference numeral 43 is an upper side positioning pin, reference numeral 51 is a roller, reference numeral 52 is a belt, reference numeral 53 is a container, reference numeral 54 is a roller, reference numeral 55 is a belt, reference numeral 56 is a slat, reference numeral 57 is a sheet discharge roller and reference numeral 58 is a drive shaft.

BEST MODE FOR CARRYING OUT THE INVENTION

Referring to the drawings, embodiments of the present invention will be explained as follows.

Embodiment 1

Figure 3:
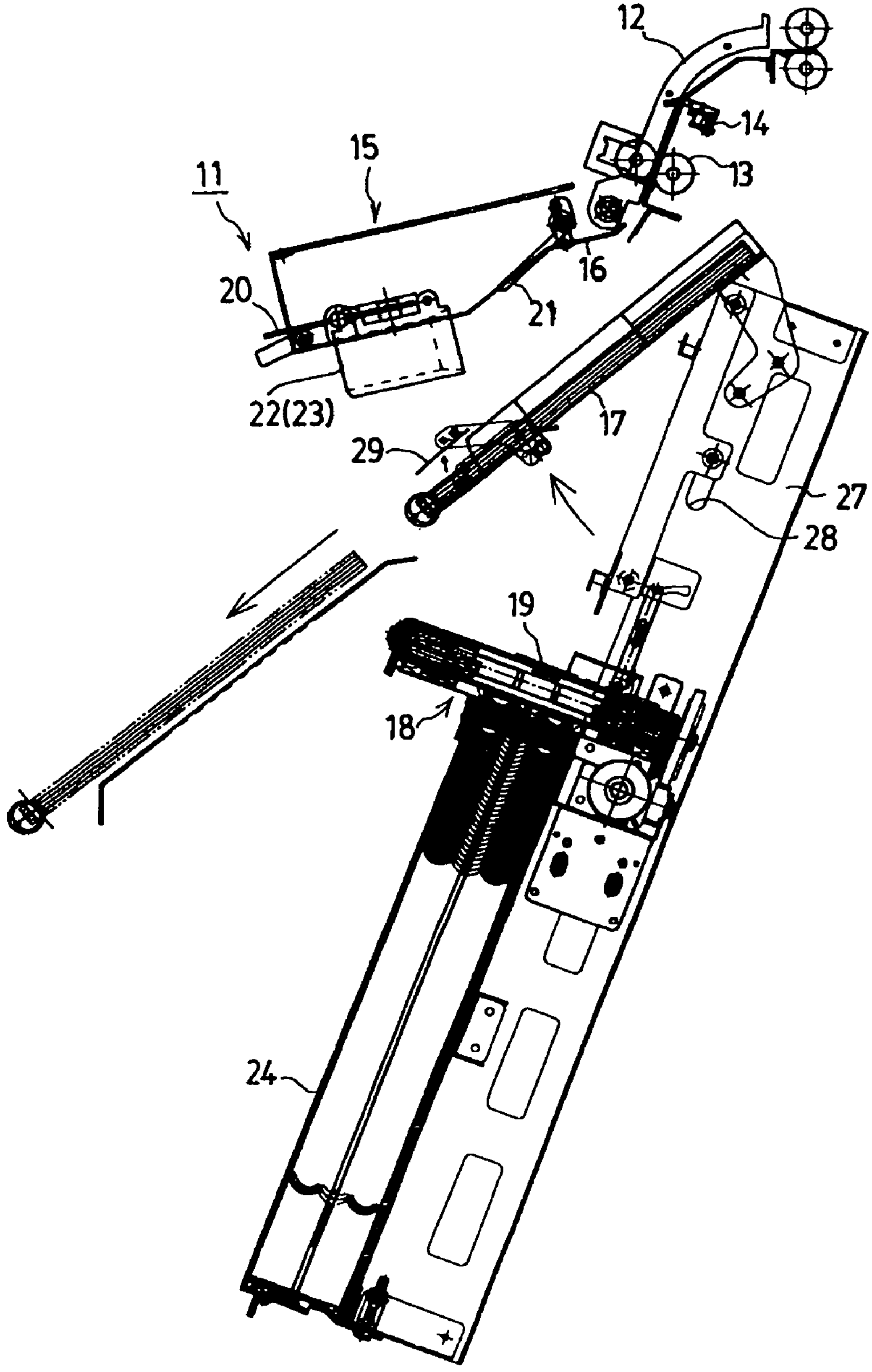
FIG. 3 is a side view showing a binding processing apparatus in a sheet discharge process.
Figure 15:
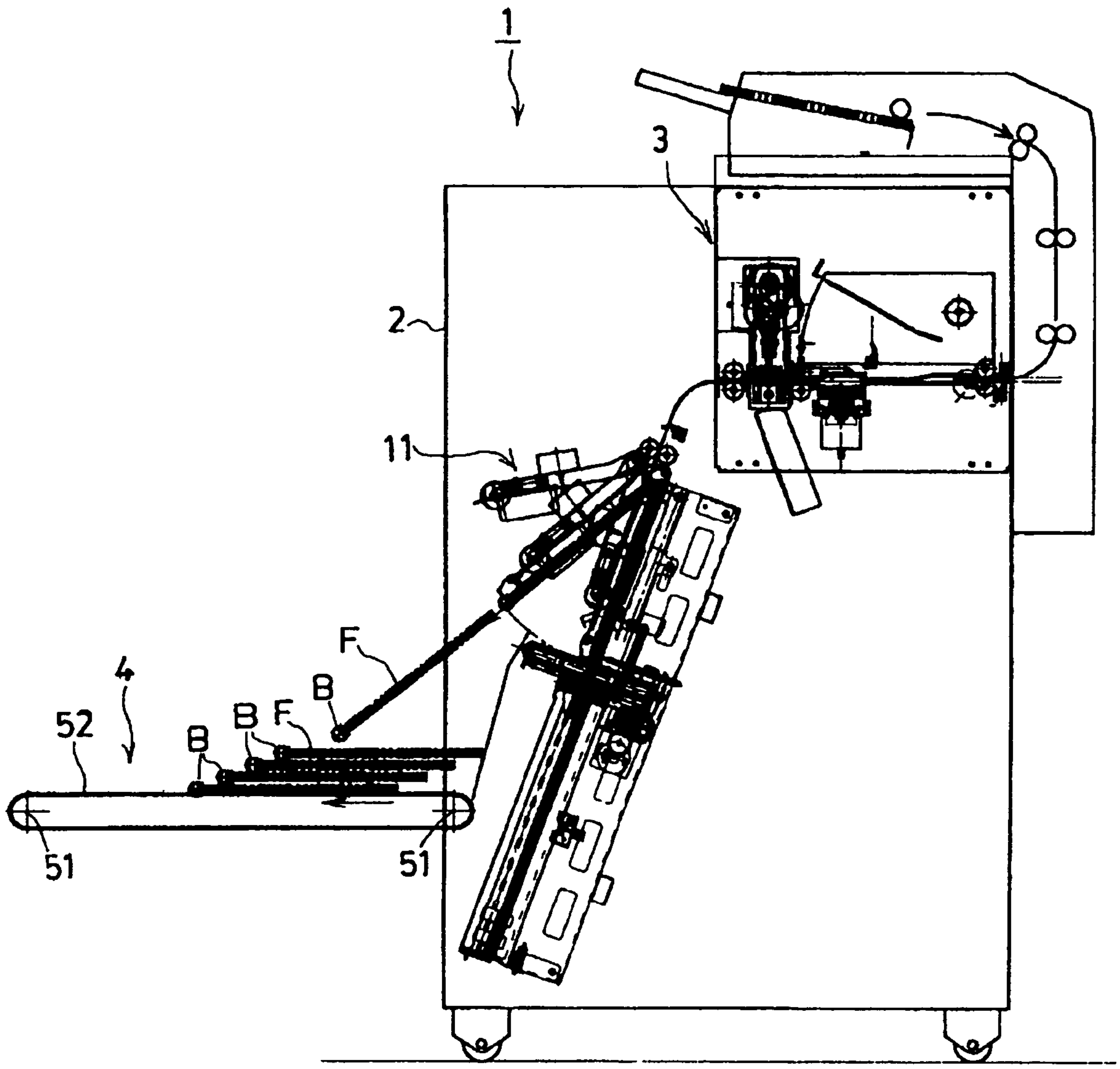
FIG. 15 is a view for explaining a longitudinal offset discharge of sheets of paper.

FIG. 1 is a view showing only a binding processing device 11 which is incorporated into a binding processing apparatus including a punching device and the binding processing device. In this binding processing device 11, operation is conducted as follows. A ring binder B is used, in which a division ring portion is arranged on both sides of a linear spine portion. This ring binder B is incorporated into a cartridge 24. Divided ring portions, which are opposed to each other interposing the spine portion, are held by a pusher 18 provided in a main body, so that the divided ring portions can be engaged with sheets of paper being formed into a ring shape. In this connection, an overall arrangement of the binding processing apparatus is described as follows. As shown in FIG. 15, a binding processing device 11 is arranged in a left lower portion in a housing 2 of the binding processing apparatus 1. A punching device 3 is arranged in a right upper portion in the housing 2. In FIG. 15, a copier (not shown) is arranged on the right of the binding processing apparatus 1. A sheet of paper discharged from the copier is sent to the punching device 3 of the binding processing apparatus 1 and punched by the punching device 3. The thus punched sheet of paper is sent out to the binding processing device 11 arranged in a lower portion and bound by the binding processing device. After the completion of this binding processing, as shown in FIG. 3, a sheet table 17 is raised and a booklet F is discharged onto a stack tray 4.

A roller 5 shown in the uppermost portion in FIG. 1 is a discharge roller of the punching device. A sheet of paper discharged from the punching device is conveyed obliquely downward along a sheet guide 12 of the binding processing device 11 and arrives at a sheet feed roller 13. Right before the sheet feed roller 13, a sheet detection sensor 14 is arranged. When the sheet detection sensor 14 detects a sheet of paper, one cycle of binding processing is carried out. The sheet of paper, which has been drawn by the sheet feed roller 13, is guided onto a sheet table 17 by a sheet guide 16 provided in a sheet guide unit 15. Then, the sheet of paper falls down by its own weight and comes into contact with a sheet forward end position regulating plate 19 arranged on the front face (the upper portion in the drawing) of a binding mechanism section 18.

Figure 2:
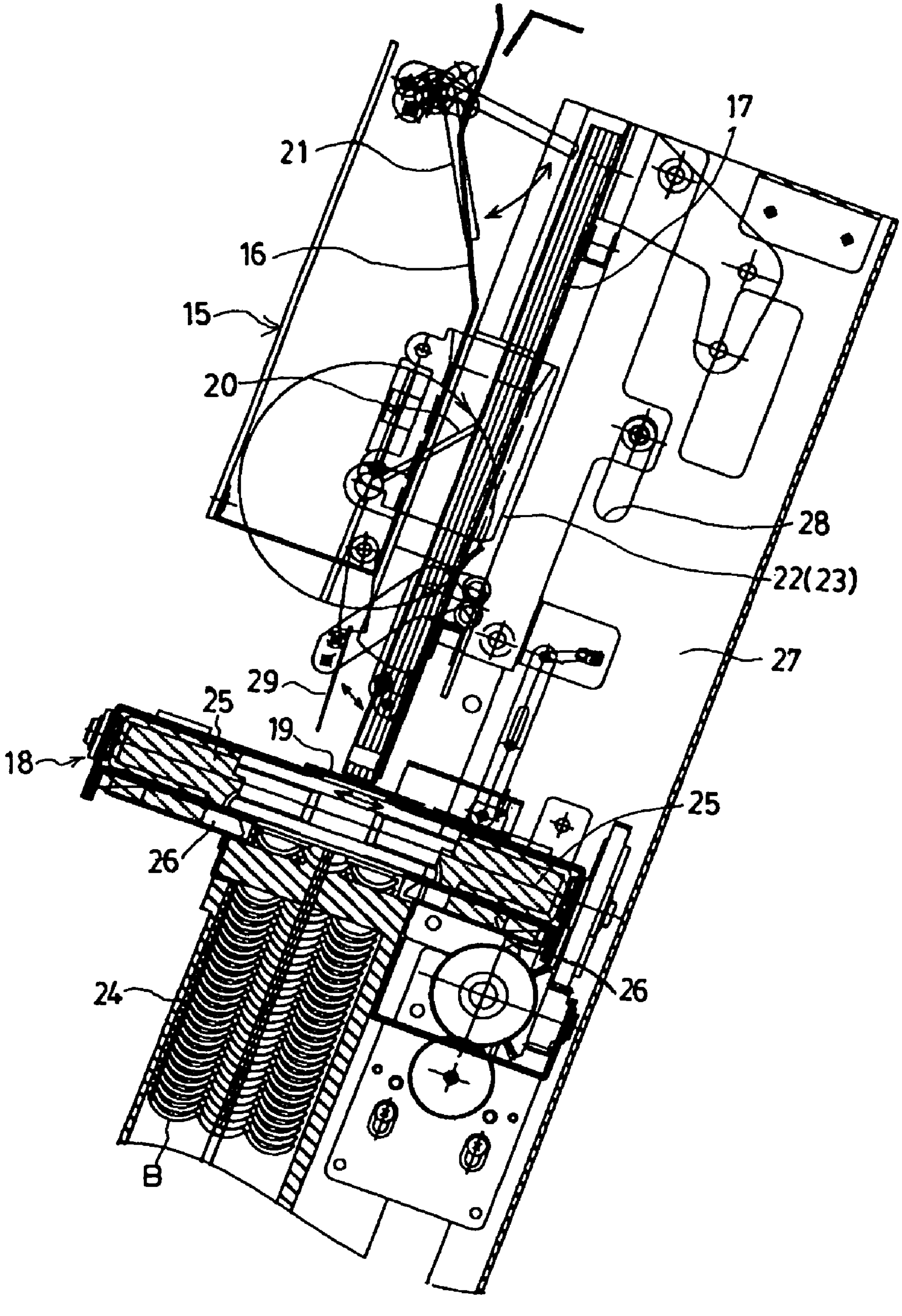
FIG. 2 is a partially enlarged view of FIG. 1

FIG. 2 is a partially enlarged view of FIG. 1. The opening and closing type sheet guide unit 15 is arranged on the sheet table 17. On the downstream and the upstream side in the sheet guide unit 15, rotary type flaps 20, 21 are arranged. The rotary type flap 20 on the downstream side turns by one revolution and rubs an upper face of the sheet of paper to the front each time the sheet of paper is fed into the rotary type flap 20. Therefore, the sheet of paper comes into contact with the sheet forward end position regulating plate 19. The rotary type flap 21 arranged on the upstream side reciprocates upward and downward each time the sheet of paper is fed into the rotary type flap 21. Therefore, the rotary type flap 21 presses a rear end portion of the sheet of paper onto the sheet table 17 so as to prevent the sheet of paper from rising up. The sheet guide unit 15 includes positioning plates 22, 23 (shown in FIGS. 6 to 8) for positioning the sheet of paper by interposing the sheet of paper in the lateral direction.

The binder mechanism section 18 is arranged being opposed to a front end portion of the sheet table 17. A binder cartridge 24 comes into contact with a back face of the binder mechanism section 18. In the binder cartridge 24, ring binders B are charged being laminated in the longitudinal direction. Each ring binder B has a shape in which a ring is divided into three pieces. The ring binders B are pushed upward by a spring and pusher (not shown) provided in the binder cartridge 24.

The binding mechanism section 18 includes: a pair of pushers 25; and a pair of sliding type separators 26. When the upper and lower separators 26 are closed, the ring binder in the front row is separated from the ring binder in the next row. The sheet table 17 can be moved forward to and backward from the binding mechanism section 18 by a sheet table moving mechanism. The sheet table 17 can be rotated from a position, at which the sheet table 17 is opposed to the binding mechanism section 18, by a sheet table rotating mechanism.

After a predetermined number of punched sheets have been fed onto the sheet table 17, the sheet table 17 is driven forward along the guide groove 28 of the frame 27, and end faces on the downstream side of the sheets of paper on the sheet table 17 come into contact with the front face of the binder cartridge 24. At this time, punch holes of the sheets of paper are located between the upper and the lower pusher 25. When the upper and the lower pusher 25 are driven being closed, the divided ring portion of the ring binder B is closed. Therefore, a protruded portion and a recessed portion of the forward end portions of the divided ring portions, which are opposed to each other, are engaged with each other and fixed into a ring shape. In this way, the sheets of paper are bound.

Next, the sheet positioning mechanism will be explained below. Sheets of paper are positioned by the sheet forward end position regulating plate 19 arranged on the front face of the binding mechanism section 18, by the sheet clamp 29 arranged in the front portion of the sheet table 17 and by the positioning plates 22, 23 arranged on the right and the left of the sheet guide unit 15. That is, the sheet forward end position regulating plate 19 composes a first positioning mechanism for positioning sheets of paper in the conveyance direction, and the positioning plates 22, 23 arranged on the right and the left compose a second positioning mechanism for positioning sheets of paper in a direction perpendicular to the conveyance direction of the sheets of paper.

Figure 4A:
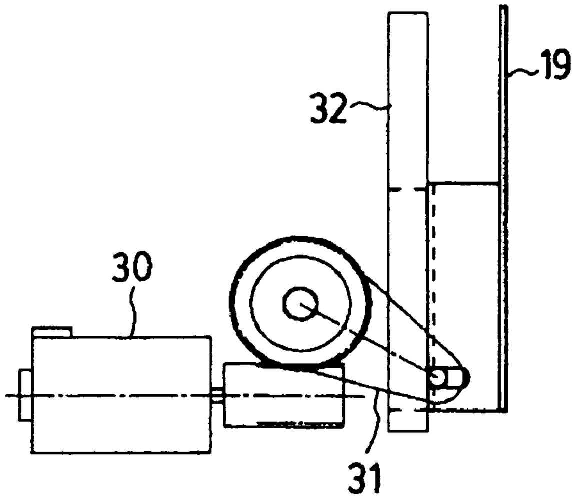
FIG. 4A is a side view showing a sheet stopper at the time of retraction.
Figure 4B:
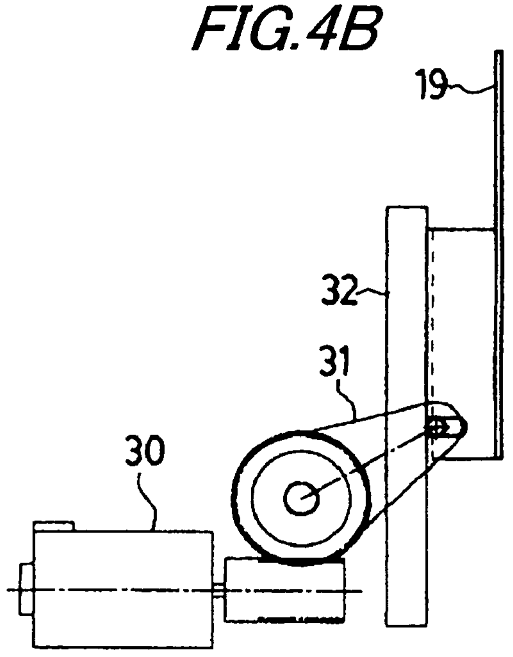
FIG. 4B is a side view showing a sheet stopper at the time of operation.

FIG. 4A is a view showing the sheet forward end position regulating plate 19 in a state of retraction in which the sheet forward end position regulating plate 19 is lowered, and FIG. 4B is a view showing the sheet forward end position regulating plate 19 in a state of operation in which the sheet forward end position regulating plate 19 is raised. A forward end portion of the lever 31, which is rotated by a motor 30, is engaged with the sheet forward end position regulating plate 19. According to the rotary direction of the lever 31, the sheet forward end position regulating plate 19 is raised or lowered along the sliding guide 32.

Figure 5A:
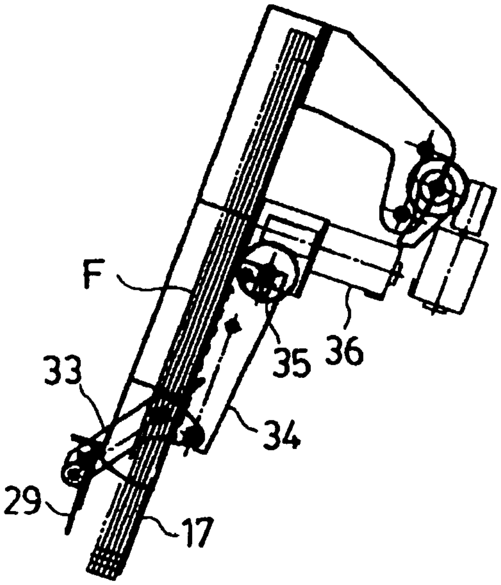
FIG. 5A is a side view showing a sheet clamp at the time of opening.
Figure 5B:
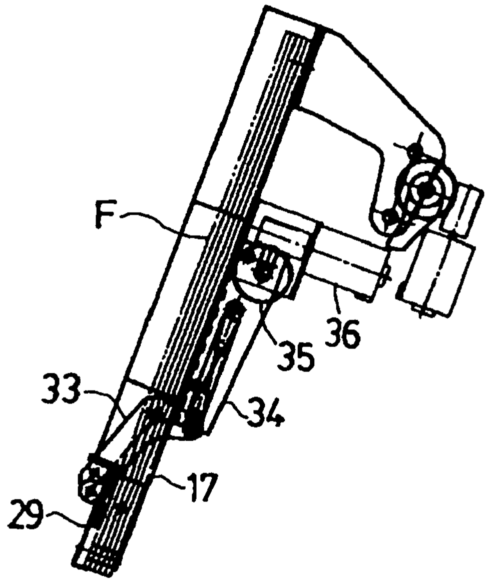
FIG. 5B is a side view showing a sheet clamp at the time of operation.

FIG. 5A is a view showing the sheet clamp 29 in an open state in which the sheet clamp 29 is raised, and FIG. 5B is a view showing the sheet clamp 29 in a closed state in which the sheet clamp 29 is lowered. The sheet clamp 29 is connected to the motor 36 via a lever 33, a link 34 and a crank shaft 35. According to the rotary direction of the motor 36 and the crank shaft 35, the clamp 29 is raised or lowered.

Figure 6:
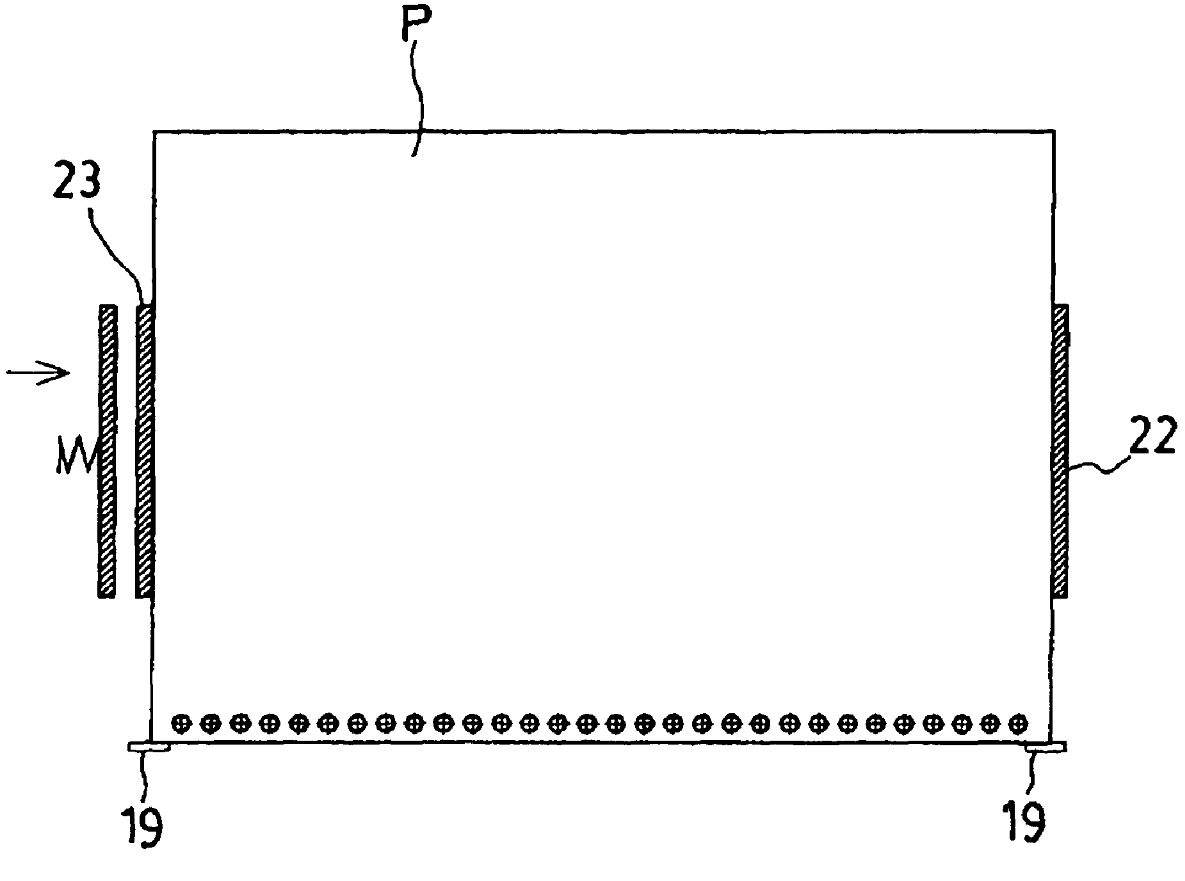
FIG. 6 is a plan view for explaining a sheet positioning process.
Figure 7:
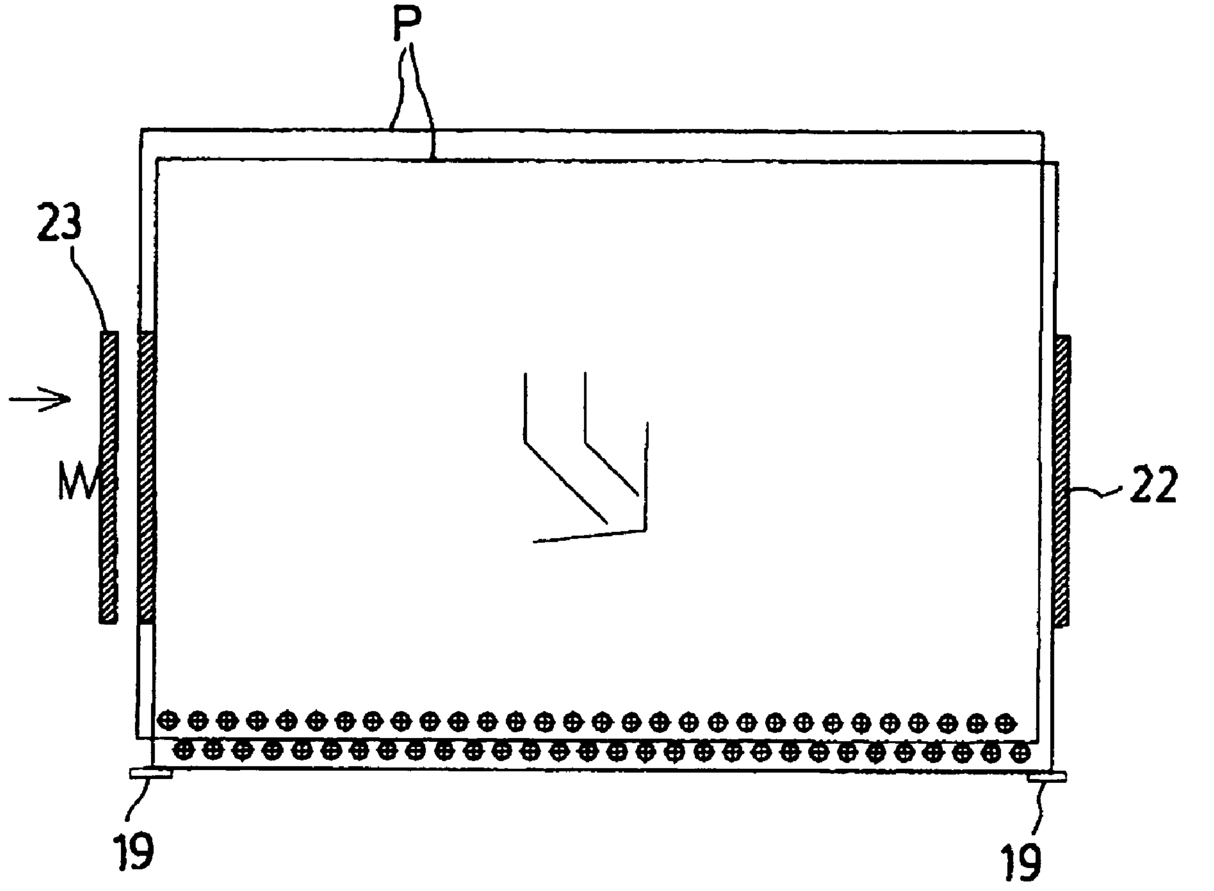
FIG. 7 is a plan view for explaining a sheet positioning process.
Figure 8:
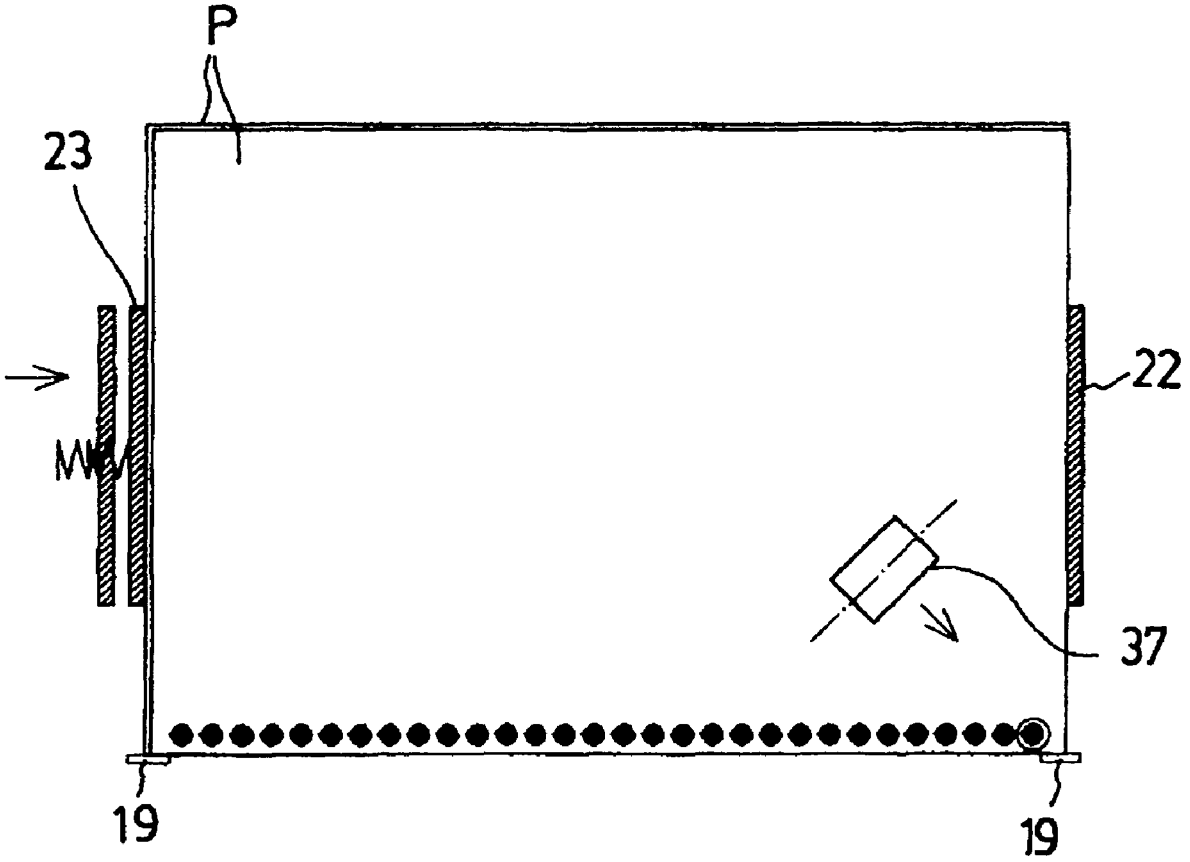
FIG. 8 is a plan view for explaining a sheet positioning process.

FIGS. 6 to 8 are views for explaining the operation of sheet positioning. Reference numeral 22 is a positioning plate for positioning the sheets of paper at a reference position in a direction perpendicular to the sheet conveyance direction, and reference numeral 23 is a movable positioning plate for pushing the sheets of paper onto the reference positioning plate 22. The positioning plate 22 is positioned so that positions of the punch holes of the sheets of paper on the sheet table 17 and positions of the pushers 25 of the binding mechanism section 18 can be made to agree with each other in the direction perpendicular to the sheet conveyance direction.

As shown in FIG. 7, each time the sheet of paper P is fed onto the sheet table 17, the movable positioning plate 23 is separated with respect to the reference positioning plate 22, and then the movable positioning plate 23 comes close to the reference positioning plate 22 as shown in FIG. 8, that is, the movable positioning plate 23 conducts one reciprocating motion. In this way, a side of the sheet of paper P is pressed for positioning onto the reference positioning plate 22 by the movable positioning plate 23. In this connection, as shown in FIG. 8, a feed roller 37, which is arranged being oblique with respect to the sheet conveyance direction, may be provided on the sheet table 17, and the sheet of paper may be positively moved to the reference position by rotating the feed roller 37.

After all sheets of paper, the number of which is predetermined, to be subjected to the binding processing have been stacked on the sheet table 17, the sheet clamp 29 is lowered and clamps one set of sheets of paper. Then, the sheet forward end position regulating plate 19 is lowered and retracted from front ends of sheets of paper, and the sheet table 17 advances forward and the front ends of sheets of paper are contacted with a front face of the binding processing mechanism section 18. After that, the ring binder is attached into the punch holes of the sheets of paper by the pushers 25 of the binding processing mechanism section 18.

After the completion of binding processing, as shown in FIG. 3, the sheet guide unit 15 and the sheet table 17 are rotated upward and the sheet clamp 29 is raised from the sheet table 17, so that the sheets of paper can be released from the sheet table 17. Due to the foregoing, the sheets of paper fall onto a stack tray (not shown). In this connection, before the completion of binding processing, the sheet guide unit 15 may be raised, and after the completion of binding processing, the sheet table 17 may be raised.

Embodiment 2

Figure 9:
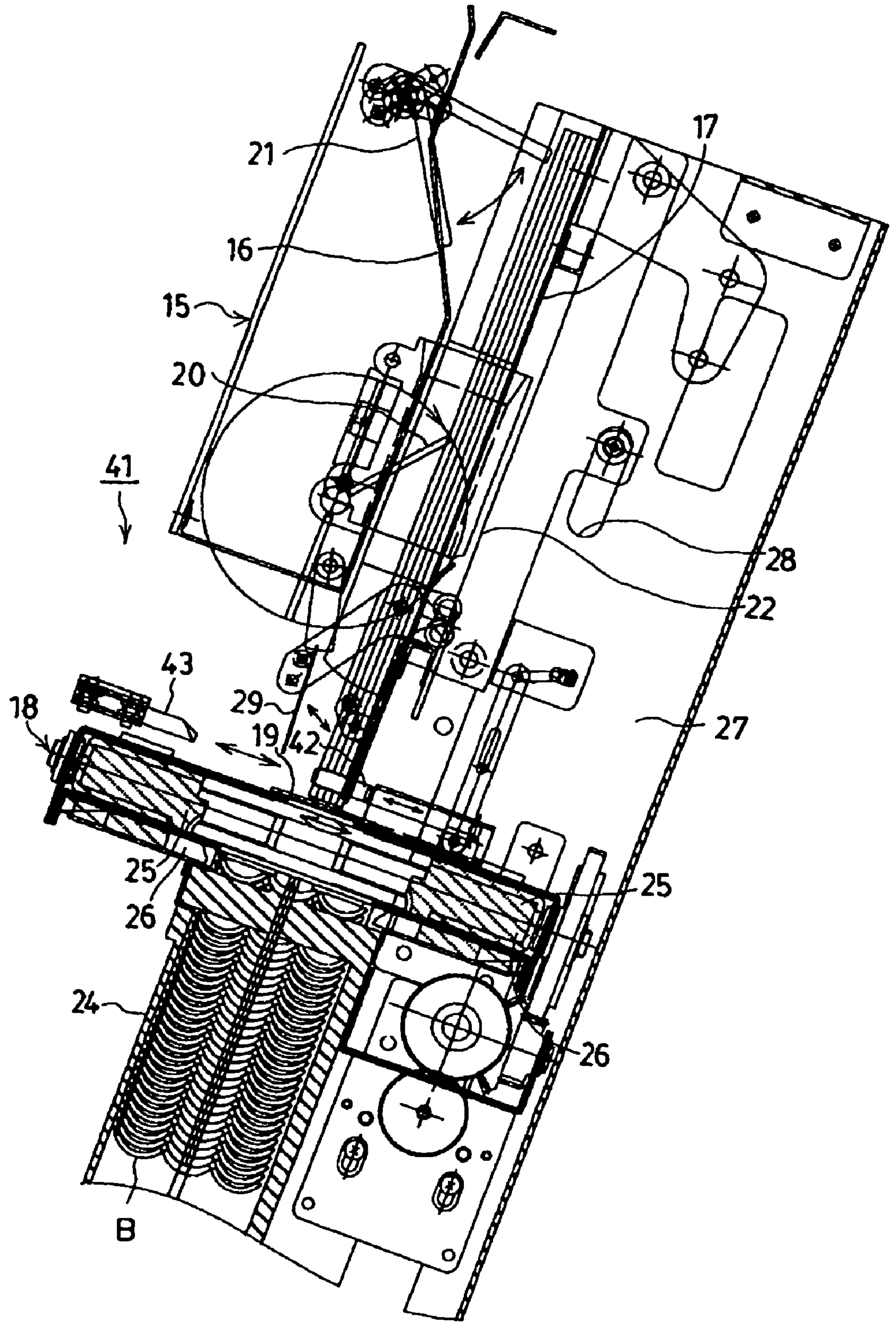
FIG. 9 is a side view showing a primary portion of a binding processing apparatus of another embodiment.

The binding processing device 41 shown in FIG. 9 is composed in such a manner that a mechanism capable of solving the problem of small deviation of punch holes on each sheet of paper is provided in addition to the structure of Embodiment 1. In the upstream of the sheet forward end position regulating plate 19 arranged on the front face of the binding mechanism section 18, a lower side positioning pin 42, which is located below the sheet table 17, and an upper side positioning pin 43, which is located above the sheet table 17, are arranged. One lower side positioning pin 42 is arranged on the right and one lower side positioning pin 42 is arranged on the left. One upper side positioning pin 43 is arranged on the right and one upper side positioning pin 43 is arranged on the left. Alternatively, a plurality o f lower side positioning pins 42 are arranged on the right and a plurality of lower side positioning pins 42 are arranged on the left. A plurality of upper side positioning pins 43 are arranged on the right and a plurality of upper side positioning pin 43 are arranged on the left. For example, the lower side positioning pins 42 are inserted into the punch holes on both sides of the sheets of paper, and the upper side positioning pins 43 are inserted into the punch holes except for the punch holes formed on both sides of the sheets of paper, so that the upper guide pins and the lower guide pins can not interfere with each other. In this connection, like reference characters are used to indicate like parts in Embodiments 1 and 2, and the explanations are omitted here.

Figure 10A:
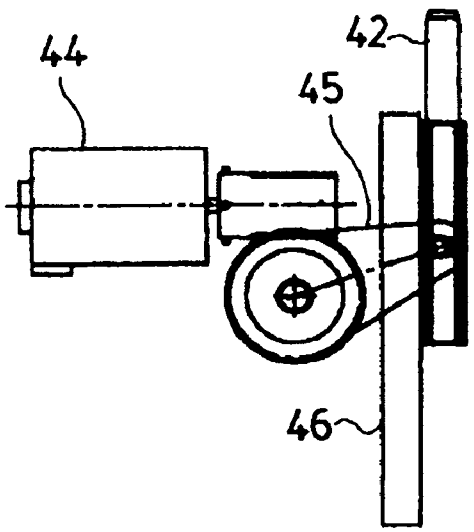
FIG. 10A is a side view showing a lower side positioning pin at the time of operation.
Figure 10B:
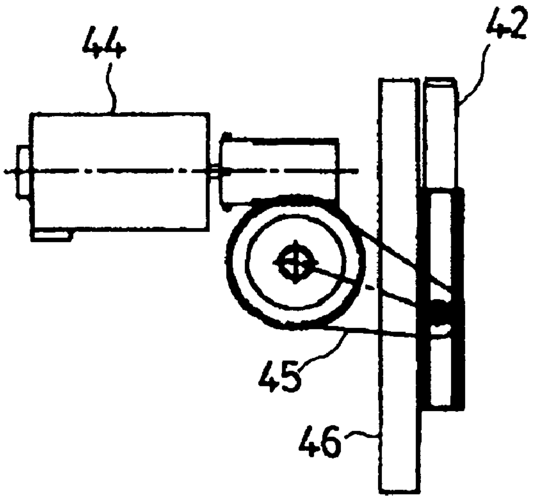
FIG. 10B is a side view showing a lower side positioning pin at the time of retraction.

FIG. 10A is a view showing a lower side positioning pin 42 in an operation state in which the lower side positioning pin 42 is raised, and FIG. 10B is a view showing a lower side positioning pin 42 in a retraction state in which the lower side positioning pin 42 is lowered. A forward end of the lever 45, which is rotated by the motor 44, is engaged with the lower side positioning pin 42. According to the rotary direction of the lever 44, the lower side positioning pin 42 is raised or lowered along the slide guide 46.

Figure 11A:
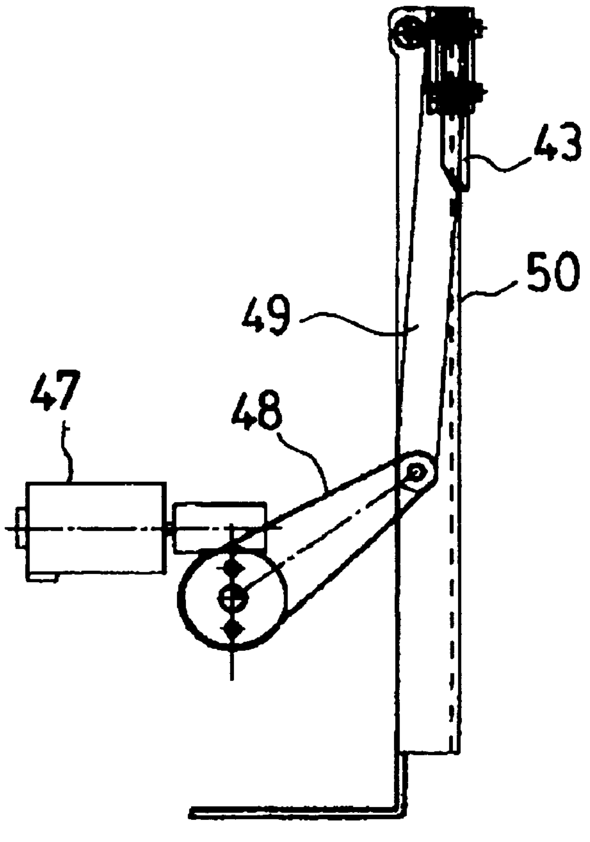
FIG. 11A is a side view showing an upper side positioning pin at the time of retraction.
Figure 11B:
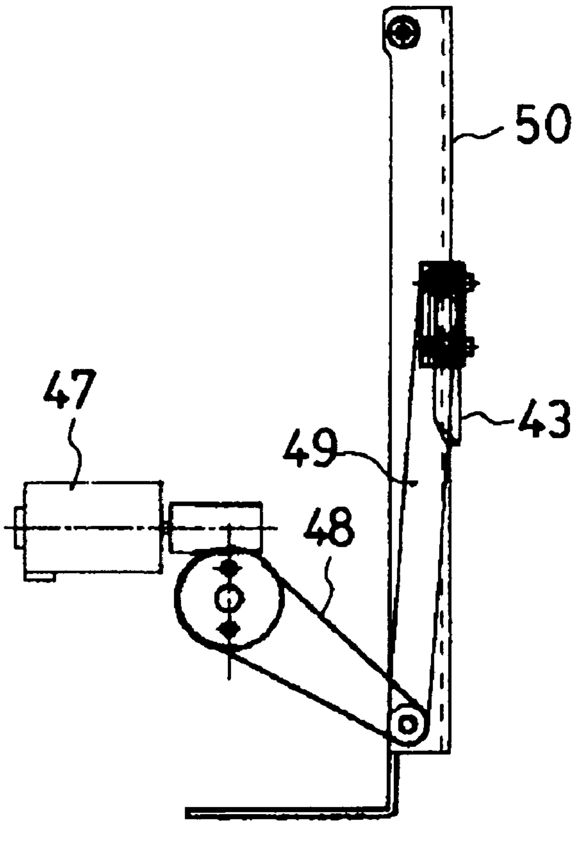
FIG. 11B is a side view showing an upper side positioning pin at the time of operation.

FIG. 11A is a view showing a state of retraction in which the upper side positioning pin 43 is raised, and FIG. 11B is a view showing a state of operation in which the upper side positioning pin 43 is lowered. The upper side positioning pin 43 is connected to a lever 48, which is rotated by the motor 47, via a link 49. According to the rotary directions of the motor 47 and the lever 48, the upper side positioning pin 43 is raised or lowered along a slide guide 50.

A diameter of the lower side positioning pin 42 is a little smaller than the diameter of a punch hole formed on the sheet of paper. Therefore, when the lower side positioning pin 42 is inserted into the punch hole, the sheets of paper can be a little moved in the longitudinal and in the lateral direction. A diameter of the upper side positioning pin 43 is a little smaller than the diameter of a punch hole formed on the sheets of paper. Therefore, when the upper side positioning pin 43 is inserted into the punch hole, the sheets of paper can be accurately positioned. When forward end portions of the upper and the lower positioning pin 43, 42 are chamfered or formed into an R-shape, the upper and the lower positioning pin 43, 42 can be easily inserted into the punch holes.

Figure 12:
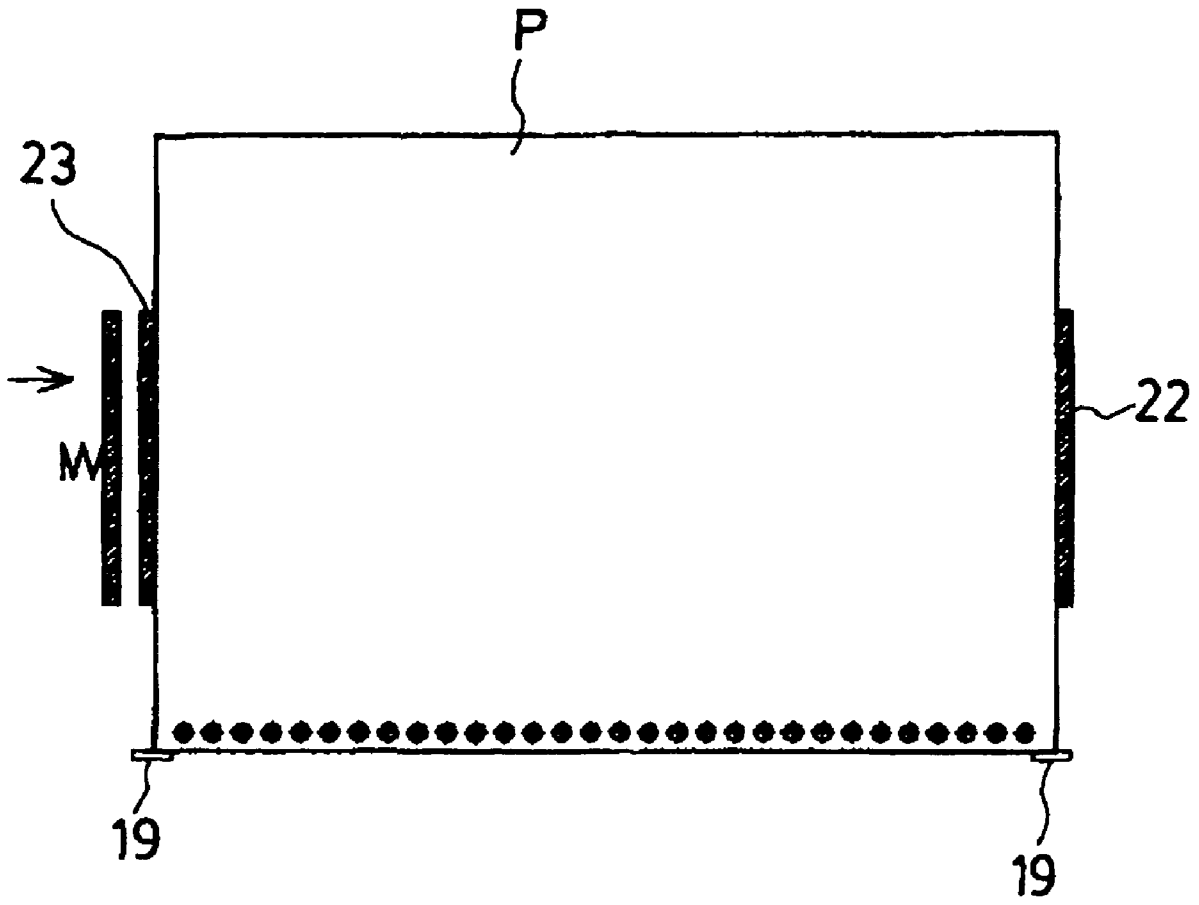
FIG. 12 is a plan view for explaining a sheet positioning process.
Figure 13:
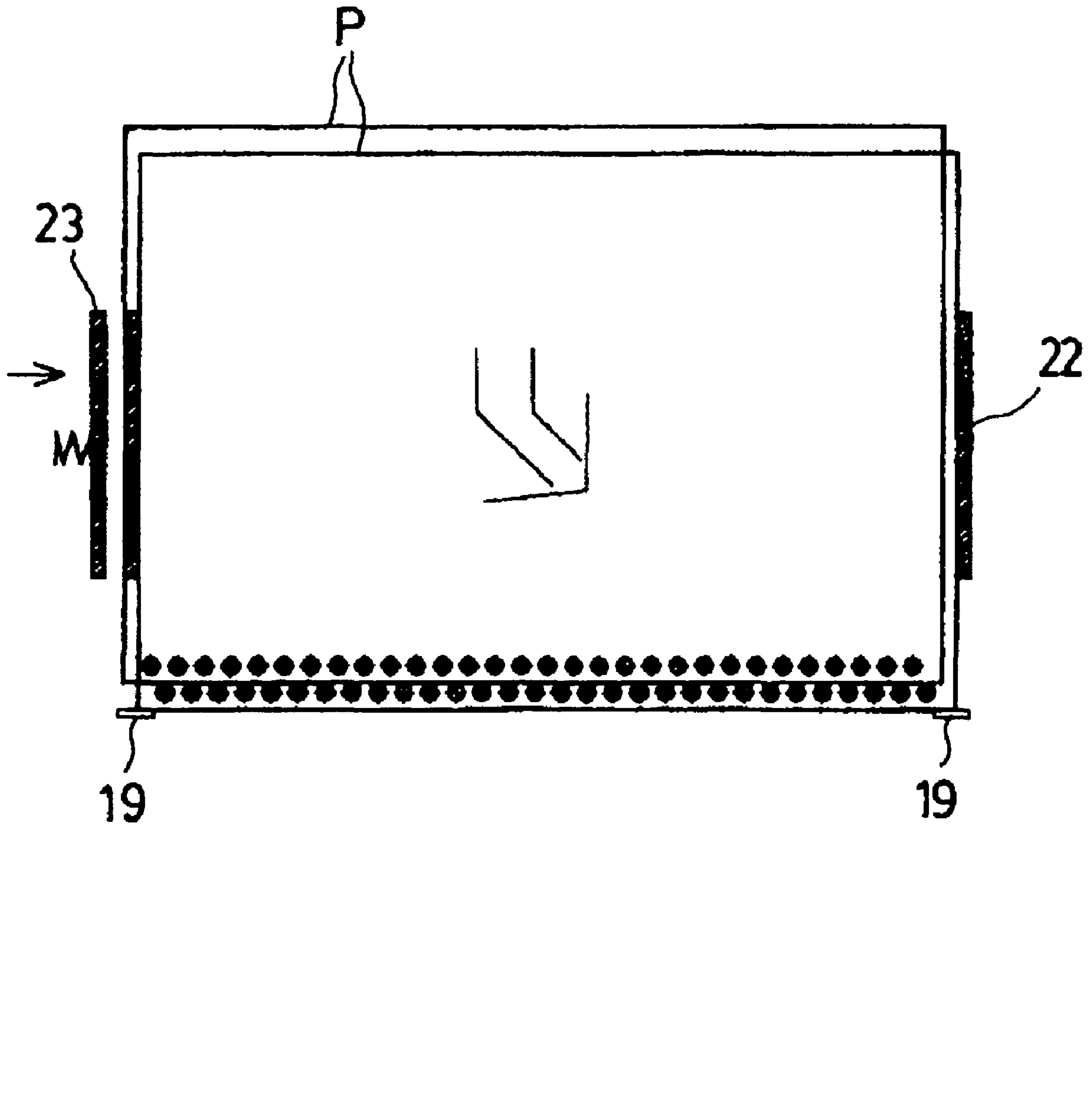
FIG. 13 is a plan view for explaining a sheet positioning process.
Figure 14:
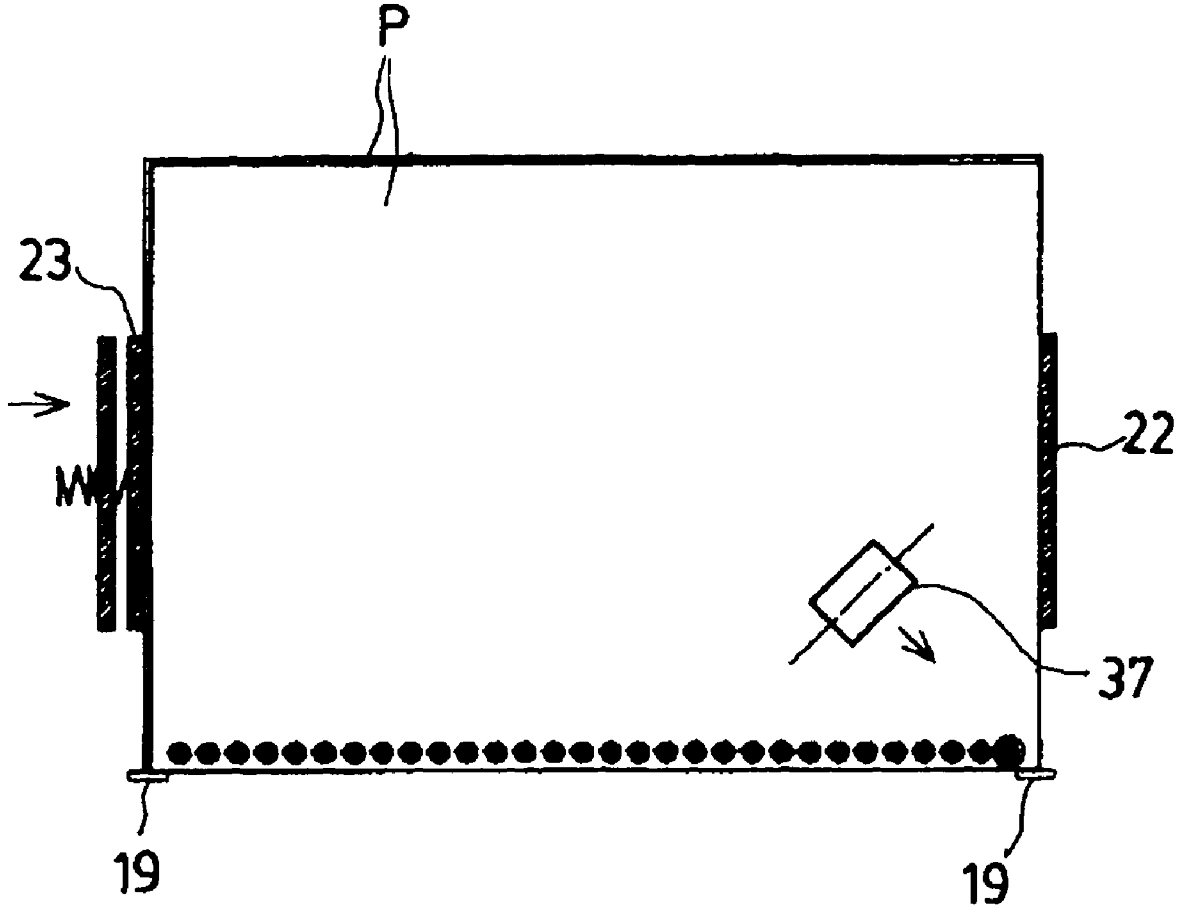
FIG. 14 is a plan view for explaining a sheet positioning process.

FIGS. 12 to 14 are views for explaining the operation of positioning sheets of paper. Reference numeral 22 is a reference positioning plate for positioning the sheets of paper in a direction perpendicular to the sheet conveyance direction. Reference numeral 23 is a movable positioning plate for pushing the sheets of paper to the reference positioning plate 22. A distance between the reference positioning plate 22 and the upper and the lower positioning pin 43, 42 in the sheet width direction is somewhat larger than a distance between the punch holes on the sheets of paper corresponding to the upper and the lower positioning pin 43, 42 and the sides of the sheets of paper. A longitudinal interval between the sheet forward end position regulating plate 19, which is provided in the front portion, and the upper and the lower positioning pin 43, 42 is set a little longer than a distance between the front end of the sheets of paper and the punch hole center. Therefore, under the condition that the lower side positioning pins 42 are inserted into the punch holes formed on the sheets of paper, the sheets of paper can be minutely moved in the longitudinal and in the lateral direction round the reference position.

As shown in FIG. 12, when the sheets of paper P are fed onto the sheet table 17, the movable positioning plate 23 pushes the sheets of paper P to the reference positioning plate 22. At this time, the lower side positioning pins 42 are driven being raised so that they can be a little protruded onto the sheet table 17, and the upper side positioning pins 43 are driven being lowered so that they can be inserted into the punch holes on the sheets of paper P and push down the sheets of paper P. At this time, the sheets of paper can be positioned being corrected so that the punch hole centers can be made to agree with the centers of the upper side positioning pins 43. After the upper side positioning pins 43 have been lowered, the sheet clamp 29 holds the sheets of paper and the upper side positioning pins 43 are raised being retracted. At the same time, the sheet clamp 29 is also retracted so as to prepare for the next sheets of paper.

Successively, when the next sheets of paper P are sent in as shown in FIG. 13, the sheets of paper P are pushed to the reference positioning plate and the sheet forward end position regulating plate, which is provided in the front portion, as shown in FIG. 14. Then, the position correcting process, which includes driving of the upper side positioning pin 43, holding of the sheets of paper and retracting the upper side positioning pins 43, is repeated. Due to the foregoing, even when errors are made in the punch hole positions and in the cutting sizes of the sheets of paper, the centers of the punch holes on the stacked sheets of paper can be accurately made to agree with each other. Accordingly, there is no possibility that a binder is defectively attached in the binder attaching process.

Embodiment 3

FIG. 15 is a view showing an embodiment of a discharging operation of a booklet which has been subjected to binding processing. The booklet discharge mechanism includes a stack tray 4, rollers 51 and a belt 52. The stack tray 4 is composed in such a manner that the wide belt 52 is provided between the rollers 51 which are arranged in the longitudinal direction and the rollers 51 are driven by a motor so as to rotate the belt 52. The control section of the binding processing apparatus 1 controls a belt drive mechanism so that an upper face of the belt 52 can be a little moved to the front each time every booklet F is discharged. Due to the above operation, as shown in the drawing, the booklets F are laminated on the stack tray 4 being a little shifted from each other. Therefore, the lamination height of the entire booklets can be reduced.

Embodiment 4

Figure 16:
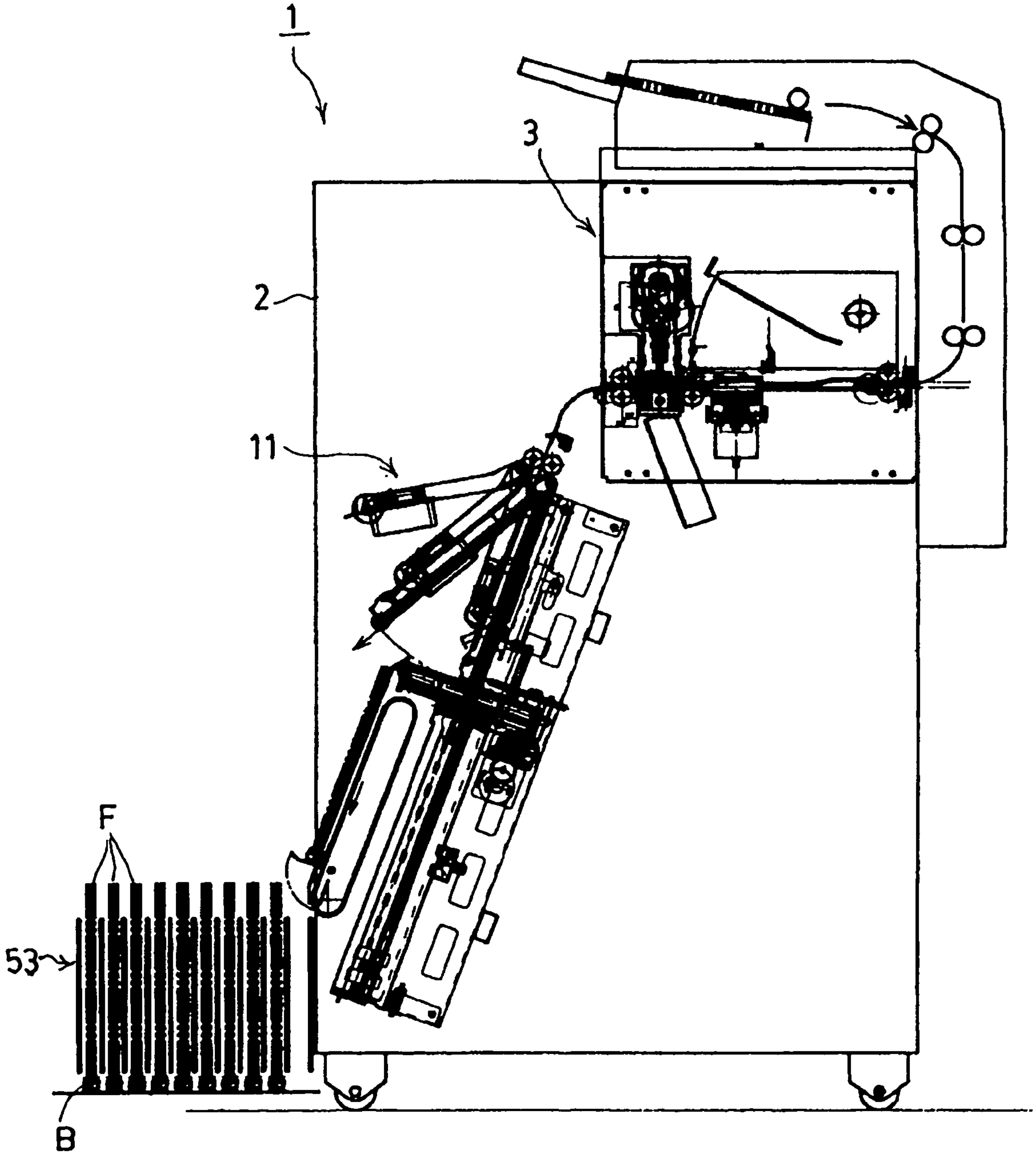
FIG. 16 is a view for explaining a vertical row discharge of sheets of paper.
Figure 17A:
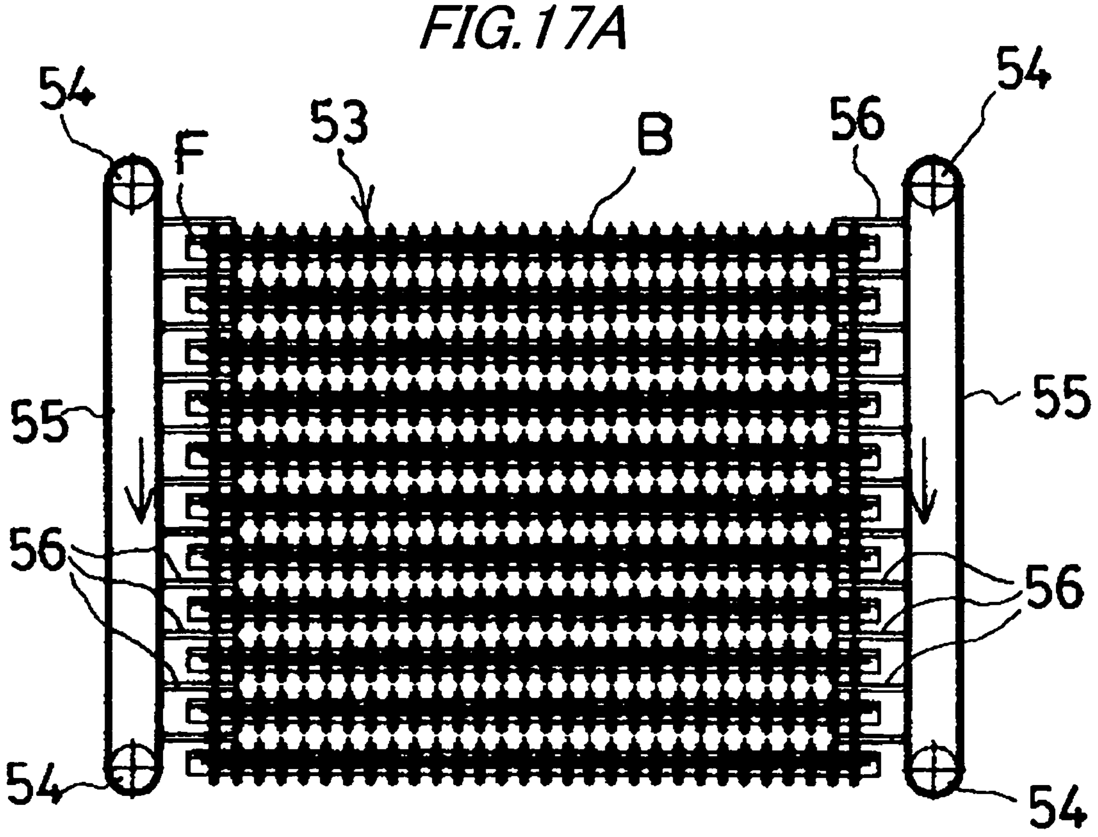
FIG. 17A is a plan view showing a vertical sheet container of a binding processing apparatus.
Figure 17B:
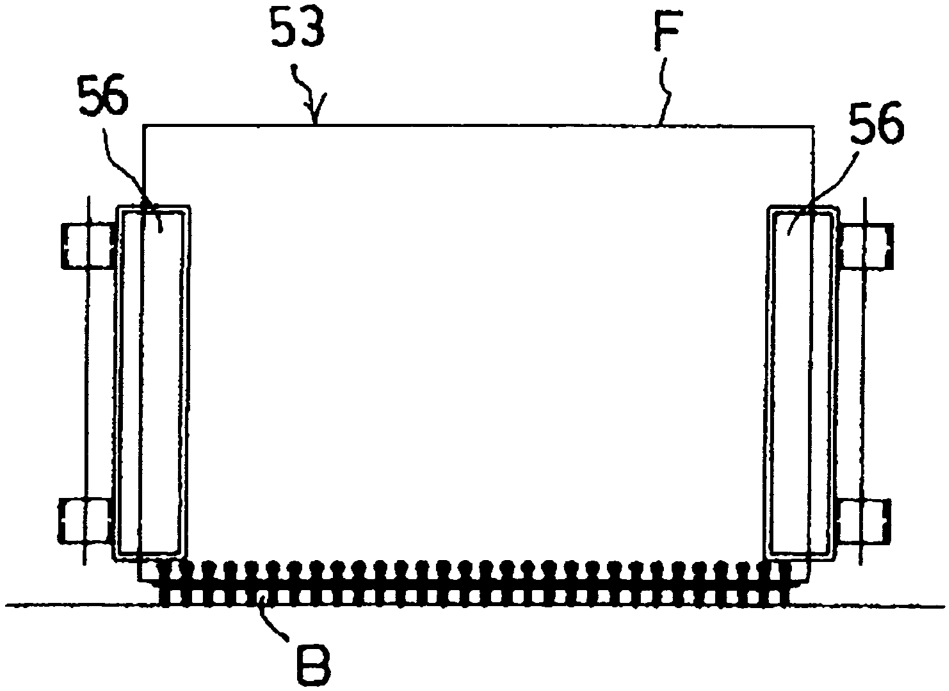
FIG. 17B is a front view of a vertical sheet container of a binding processing apparatus.

The booklet discharge mechanism of the binding processing apparatus 1 shown in FIGS. 16 and 17 includes a container 53, rollers 54, a belt 55 and slats 56. The discharged booklets are accommodated upright in the container. As shown in FIGS. 17A and 17B, in the container 53, the belt 55 is provided between the rollers 54 which are arranged in the longitudinal direction at both end portions in the lateral direction. The right and the left belt 55 are symmetrically, synchronously rotated. Slats 56 are attached to the belt 55 at regular intervals. Therefore, both end portions on the right and the left of the booklets F are inserted into between the continuous slats so that the booklets F can be accommodated upright. The belts 55 are also controlled by the control section of the binding processing apparatus 1. Therefore, each time one booklet is discharged, the inside faces of the right and the left belt 55 are moved by a predetermined distance (an interval between the slats). Due to the foregoing, the booklets are accommodated in the container 53 being divided and arranged in the longitudinal direction.

Embodiment 5

Figure 18:
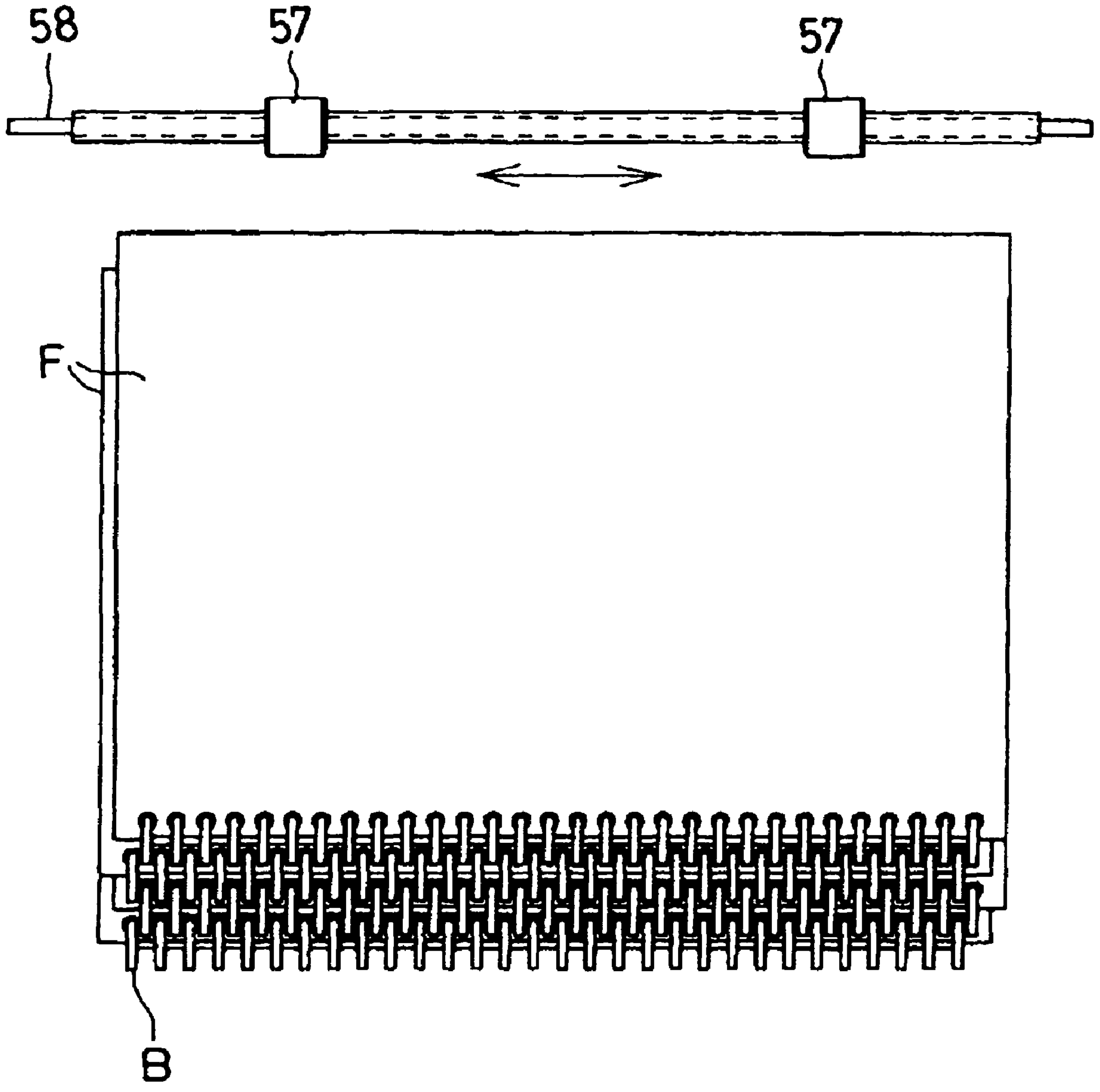
FIG. 18 is a view for explaining an alternate offset discharge of sheets of paper.

FIG. 18 is a view showing another embodiment of the present invention. The booklet discharge mechanism includes sheet discharge rollers 57 mounted on a shaft 58. The sheet discharge rollers 57 are arranged being capable of sliding in the lateral direction with respect to the drive shaft. Each time one booklet is discharged, while the sheet discharge rollers 57 are coming into elastic contact with the booklet, the booklet is alternately slid in the lateral direction and discharged. Due to the foregoing, under the condition that the ring portions of the ring binders B of the booklets F are alternately shifted zigzag in the lateral direction, the booklets F are stacked on the stack tray, and the volume can be reduced.

In this connection, it should be noted that the present invention is not limited to the above specific embodiments. Variations may be made by those skilled in the art without departing from the spirit and scope of the invention. Of course, the present invention covers those variations.

The present application is based on Japanese Patent Application (Patent Application No. 2004-022156) filed on Jan. 29, 2004. The contents of which are incorporated herein by reference.

INDUSTRIAL APPLICABILITY

In the binding processing apparatus of the present invention, the positioning means is composed so that the positional relation between sheets of paper and a binder at the time of attaching the binder can be made to be the same as the positional relation between the sheets of paper and a punch at the time of punching the sheets of paper. Therefore, when the binder is attached to the sheets of paper, positions of punch holes can be made to accurately agree with positions of ring portions of a division type ring binder. Accordingly, there is no possibility that the division type ring binder is defectively attached to the sheets of paper.

When the binding processing apparatus is composed so that booklets, which have been subjected to the binding processing, can be successively shifted to each other in the lateral and in the longitudinal direction, ring binders attached to the booklets do not interfere with each other. Alternatively, ring binders attached to the booklets are not overlapped on each other. Therefore, the height and volume of the stacked booklets can be reduced and the booklets can be easily handled.

The invention claimed is:

1. A binding processing apparatus comprising:
- a punching device;
- a sheet table on which sheets of paper punched by the punching device are stacked;
- a binding mechanism section in which a division ring type binder is simultaneously attached to a plurality of punch holes of one set of sheets of paper stacked on the sheet table;
- a first positioning mechanism for positioning the sheets of paper in a sheet conveyance direction; and
- a second positioning mechanism for positioning the sheets of paper in a direction perpendicular to the sheet conveyance direction,
- wherein the first and the second positioning mechanism position the sheets of paper so that the punch holes on the sheets of paper agree with a binding piece that simultaneously interlocks with the plurality of punch holes at a time of binder attaching processing, and the first positioning mechanism includes a sheet forward end position regulating plate capable of being retracted and provided at a forward end portion of the sheet table as a reference of aligning the forward end portions of the sheets of paper, and after one set of sheets of paper is positioned, the sheet forward end position regulating plate is retracted and the one set of sheets of paper are sent to the binding mechanism section.

2. The binding processing apparatus according to claim 1, wherein the second positioning mechanism is capable of being raised and retracted from the sheet table.

3. The binding processing apparatus according to claim 1, further comprising:

an upper side slide pin capable of descending downward from an upper position of the sheet table to the sheet table, wherein the upper side slide pin is inserted into a punch hole formed on the sheets of paper on the sheet table so as to position the sheets of paper on the basis of the punch hole.

4. The binding processing apparatus according to claim 3, further comprising:

a movable clamp for clamping the sheets of paper after the sheets of paper have been positioned by the upper side slide pin, wherein the slide pin is retracted and the sheets of paper are sent to the binding mechanism section after the sheets of paper are clamped.

5. The binding processing apparatus according to claim 4, wherein after the upper side slide pin positions the sheets of paper and the movable clamp clamps the sheets of paper, the slide pin is retracted and the movable clamp is released so as to prepare for a supply of the next sheets of paper.

6. The binding processing apparatus according to claim 1, further comprising:

a lower side slide pin capable of ascending upward from a lower portion of the sheet table; and an upper side slide pin, wherein the sheets of paper are positioned on the basis of the punch holes when the upper side and the lower side slide pin are inserted into the punch holes formed on the sheets of paper.

7. The binding processing apparatus according to claim 6, further comprising:

a movable clamp for clamping the sheets of paper after the sheets of paper are positioned by the upper and the lower side slide pins, wherein the upper and the lower side slide pins are retracted and the sheets of paper are sent to the binding mechanism section, after the sheets of paper are clamped.

8. The binding processing apparatus according to claim 7, wherein the slide pin is refracted and the movable clamp is released so as to prepare for a supply of the next sheets of paper, after the upper side slide pin positions the sheets of paper and the movable clamp clamps the sheets of paper.

9. The binding processing apparatus according to claim 1, further comprising:

a sheet table moving mechanism for advancing the sheet table to the binding mechanism section and for retracting the sheet table from the binding mechanism section; and a sheet table rotating mechanism for rotating the sheet table from a position opposed to the binding mechanism section so as to discharge the sheets of paper.

10. The binding processing apparatus according to claim 1, further comprising:

a container for receiving booklets discharged after the completion of binding processing;

a plurality of vertical type slats respectively provided on the right and the left in the container; and a longitudinally moving mechanism of moving the vertical slats, wherein the right and the left vertical type slats are synchronously driven, and the booklets, which are discharged after the completion of biding processing, are accommodated in the spaces, which are divided by the vertical type slats, one by one.

11. The binding processing apparatus according to claim 1, further comprising:

a booklet discharge mechanism for discharging a booklet which has been subjected to the binding process.

12. The binding processing apparatus according to claim 11, wherein the booklet discharge mechanism discharges booklets, while the booklets are successively and alternately being shifted from each other in a lateral direction so that the rings of the binder attached to the next row of booklet can enter spaces formed between the rings of the binder attached to the front row of booklet.

13. The binding processing apparatus according to claim 11, wherein the booklet discharge mechanism successively shifts a falling position of the booklet in a longitudinal direction so that the ring binders of the booklets can not be overlapped on each other.

14. The binding processing apparatus according to claim 11, further comprising:

a container for receiving booklets discharged after the completion of binding processing, wherein the container includes partitions for dividing the discharged booklets one by one, and the booklet discharge mechanism discharges the booklets one by one into the spaces divided by the partitions.

15. A binding processing apparatus comprising:

a punching device;

a sheet table on which sheets of paper punched by the punching device are stacked;

a binding mechanism section in which a division ring type binder is attached to punch holes of one set of sheets of paper stacked on the sheet table;

a first positioning mechanism for positioning the sheets of paper in a sheet conveyance direction, the first positioning mechanism including a sheet forward end position regulating plate capable of being retracted and provided at a forward end portion of the sheet table as a reference for aligning the forward end portions of the sheets of paper; and a second positioning mechanism for positioning the sheets of paper in a direction perpendicular to the sheet conveyance direction, wherein the first and the second positioning mechanisms position the sheets of paper such that the punch holes on the sheets of paper agree with a binding piece and the sheet forward end position regulating plate is retracted at a time of binder attaching processing.

16. A binding processing apparatus comprising:

a housing which comprises a first end, and a second end spaced vertically from the first end; and a binding process device having a first longitudinal axis disposed between the first and second ends which comprises a binding process device frame, a sheet guide unit that directs first and second sheets of paper in a first direction, the first sheet of paper and the second sheet of paper each having a plurality of punch holes, the sheet guide unit including a reference positioning plate for positioning the first and second sheets of paper at a reference position in a direction perpendicular to the first direction, and a movable positioning plate separated from the reference position plate such that the movable position plate oscillates to push the first sheet of paper and the second sheet of paper against the reference positioning plate;

a sheet table disposed between the sheet guide unit and the first end which comprises a sheet table frame having first and second ends, the first end of the sheet table frame and the binding process device frame forming a hinge such that the sheet table frame pivots between a closed position in which the binding process device frame abuts the second end of the sheet table and an open position in which the second end of the sheet table frame is rotated away from the binding process device frame, a surface connected to the sheet table frame such that the surface supports the first and second sheets of paper in the closed and open positions, and a clamp secured to the sheet table frame which comprises a raised configuration such that the sheet clamp is disposed a first distance from the surface, and a lowered configuration such that sheet clamp is disposed a second distance from the surface, the first distance being greater than the second distance; and a binding mechanism section disposed between the sheet table and the first end which comprises a binder cartridge including a front face, upper and lower binding ring pushers proximate the front face, and a sheet forward end regulating plate opposite the binder cartridge and adjacent the sheet table such that the sheet forward end regulating plate includes an extended position in which the sheet forward end regulating plate blocks conveyance of the first and second sheets to the front face of the binder cartridge, and a retracted position in which the sheet forward end regulating plate allows conveyance of the first and second sheets to the front face of the binder cartridge, wherein the binding process device comprises a first configuration for binding the first and second sheets such that the sheet table frame is in the closed position, the clamp is in the lowered position, and the sheet forward end regulating plate is in the retracted position, and a second configuration for discharging the first and second sheets such that the sheet table frame is in the open position, and the clamp is in the raised configuration.

17. The binding processing apparatus of claim 16, further comprising a punching unit with first and second discharge rollers disposed adjacent the sheet guide unit such that the punching unit punches each of the first and second sheets of paper to form the plurality of punch holes on the first and second sheets of paper and the first and second discharge rollers transfer the first and second sheets of paper to the sheet guide unit.

* * * * *